(12) United States Patent
Steinlechner et al.

(10) Patent No.: US 11,454,541 B2
(45) Date of Patent: Sep. 27, 2022

(54) METHOD FOR IMAGING OR SPECTROSCOPY WITH A NON-LINEAR INTERFEROMETER

(71) Applicant: Fraunhofer-Gesellschaft zur Förderung der angewandten Forschung e.V., Munich (DE)

(72) Inventors: Fabian Steinlechner, Jena (DE); Marta Gilaberte Basset, Jena (DE); Markus Gräfe, Jena (DE)

(73) Assignee: Fraunhofer Gesellschaft Zur Förderung Der Angewandten Forschung E.V.

( * ) Notice: Subject to any disclaimer, the term of this patent is extended or adjusted under 35 U.S.C. 154(b) by 0 days.

(21) Appl. No.: 17/181,411

(22) Filed: Feb. 22, 2021

(65) Prior Publication Data

US 2021/0270671 A1    Sep. 2, 2021

(30) Foreign Application Priority Data

Feb. 28, 2020    (EP) .................................. 20159989

(51) Int. Cl.
    *G01B 9/02*    (2022.01)
    *G01J 3/453*    (2006.01)
    (Continued)

(52) U.S. Cl.
    CPC ........ *G01J 3/4535* (2013.01); *G01B 9/02044* (2013.01); *G01J 3/0205* (2013.01); *G01J 3/2823* (2013.01)

(58) Field of Classification Search
CPC ...... G01J 3/4535; G01J 3/0205; G01J 3/2823; G01B 9/02044; G01B 9/02041
See application file for complete search history.

(56) References Cited

U.S. PATENT DOCUMENTS

2018/0180401 A1    6/2018    Roztocki et al.
2019/0086330 A1    3/2019    Krivitskiy et al.

FOREIGN PATENT DOCUMENTS

| CN | 105676558 A | * | 6/2016 |
| JP | 2019191087 A | | 10/2019 |
| WO | 2020015809 A1 | | 1/2020 |

OTHER PUBLICATIONS

M. V. Chekhova and Z. Y. Ou, "Nonlinear interferometers in quantum optics," Adv. Opt. Photon. 8, 104-155 (2016) (Year: 2016).*

(Continued)

*Primary Examiner* — Tarifur R Chowdhury
*Assistant Examiner* — Jonathon Cook
(74) *Attorney, Agent, or Firm* — Lerner, David, Littenberg, Krumholz & Mentlik, LLP

(57) ABSTRACT

A system and method is provided for imaging and/or spectroscopy involving generation of a first signal field and a first idler field, illumination of the object with the first idler field, generation of second signal field and a second idler field, combination of the first and second idler fields, such that the two fields are indistinguishable, combination of the first and second signal fields, such that the two fields interfere, first measurement of the interfered signal field by a detection means, one or more additional measurements of the interfered signal field, wherein for each additional measurement a different phase shift is generated in the setup, and wherein all measurements are carried out within the stability time of the setup, and calculation of a phase function.

14 Claims, 4 Drawing Sheets

(51) Int. Cl.
*G01J 3/02* (2006.01)
*G01J 3/28* (2006.01)

(56) References Cited

OTHER PUBLICATIONS

J. Chem. Phys. 147, 064201 (2017); https://doi.org/10.1063/1.4997736 (Year: 2017).*
Appl. Phys. Lett. 107, 121106 (2015); https://doi.org/10.1063/1.4931686 (Year: 2015).*
Gabriela Barreto Lemos et al: "Quantum imaging with undetected photons", Nature 13586, vol. 512, No. 7515, Aug. 28, 2014 (Aug. 28, 2014), pp. 409-412.
European Search Report for Application No. EP 20159989.1, dated Sep. 3, 2020, 14 pages.

* cited by examiner

METHOD FOR IMAGING OR SPECTROSCOPY WITH A NON-LINEAR INTERFEROMETER

CROSS-REFERENCE TO RELATED APPLICATION

The present application claims priority from European Patent Application No. 20159989.1, filed on Feb. 28, 2020, the disclosure of which is hereby incorporated herein by reference.

TECHNICAL FIELD

The present invention provides an improvement method for imaging or spectroscopy with a non-linear interferometer and an improvement apparatus for imaging or spectroscopy.

BACKGROUND

Non-linear interferometer allows probing an unknown object, preferably sample, at a particular wavelength, while detecting correlated light at the same or a different wavelength. In known non-linear interferometry systems, it is crucial to have an absolutely correct interferometer setting for perfectly determining the maximum constructive and destructive images. To get this, the interferometer must be adjusted before each measurement. This, for example, can be done by the measurement of the visibility of the interferometer to find the maximum constructive and/or destructive interference without the object in the setup.

Due to stability drifts of the interferometer, the stability of the setup cannot be guaranteed for long operation times which results in a decrease of the interference visibility and a decrease of the precision of the measurement. The stability drifts can occur among other things due to thermal changes in the setup, mechanical and/or thermal instability of the components and even vibrations of the underground. For longer operation times in known systems the setup has to be readjusted to the maximum destructive and/or constructive interference or it is necessary to readjust the fringe center.

SUMMARY

It is an object of the present invention to provide an improved, more precise method for imaging or spectroscopy with a non-linear interferometer, also allowing longer measurement times and an improved more precise apparatus for imaging or spectroscopy.

According to the present invention, a method for imaging and/or spectroscopy of an object is provided.

In accordance with an aspect of the present disclosure, the method comprises the steps:

i) generation of a first signal field $s_1$ and a first idler field $i_1$, by pumping a first non-linear medium with a pump beam, such that the two fields are correlated, ii) illumination of the object with the first idler $i_1$ field, respectively by transmission and/or reflection, iii) generation of a second signal field $s_2$ and a second idler field $i_2$,
   by pumping a spatial separate second non-linear medium with the pump beam, or
   by pumping the first non-linear medium a second time with the pump beam, such that the two fields are correlated, iv) combination of the first $i_1$ and second $i_2$ idler fields, such that the two fields are indistinguishable, and combination of the first $s_1$ and second $s_2$ signal fields, such that the two fields interfere, v) first measurement of the interfered signal field $s_{12}$ by a detection means, vi) one or more additional measurements of the interfered signal field $s_{12}$ by the detection means,
   wherein for each additional measurement in step vi) a different phase shift $\alpha$ is generated in the setup, and
   wherein the first measurement in step v) and the one or more additional measurements in step vi) are all carried out within the stability time of the setup, vii) calculation of the phase function $\Phi$ out of the measurements from step v) and step vi) in order to get an image and/or a spectrum of the object.

The invention further provides an apparatus for imaging and/or spectroscopy.

In accordance with an aspect of the disclosure, the apparatus comprises a pump source to generate a pump beam, and a first signal $s_1$ and idler $i_1$ field generation means pumped by the pump beam, and a second signal $s_2$ and idler $i_2$ field generation means pumped by the pump beam, wherein the first and the second field generation means are
   two spatial separated nonlinear media pumped by the pump beam, or
   one non-linear medium, pumped by the pump beam a first time to generate a first signal $s_1$ and idler $i_1$ field and pumped a second time to generate a second signal $s_2$ and idler $i_2$ field, and an object to be measured which is illuminated, respectively by transmission or reflection, by the first idler field $i_1$, and a signal combining means to overlap the first signal $s_1$ and second signal $s_2$ fields, such that the two fields interfere, and an idler combining means to overlap the first idler $i_1$ and second idler $i_2$ fields, such that the two fields are indistinguishable, and a detection means to detect the intensity and/or phase of the interfered signal field.

Whereby a phase shifter is arranged in the first signal $s_1$ field, and/or in the second signal $s_2$ field, and/or in the pump beam, and/or in the indistinguishable first and second signal fields $s_1$ and $s_2$, wherein the phase shifter is adapted to introduce a phase shift $\alpha$ in the apparatus during the measurement in order to get an image and/or a spectrum of the object.

The present invention provides an improved solution to the known systems where it is not necessary to adjust and/or readjust the interferometer. Preferably it is not necessary to adjust the setup at the beginning of the measurement without the object in the setup and/or it is not necessary to readjust the system for longer measurements times than the stability time of the interferometer. Another advantage of this invention is that it is not necessary to find the interference fringe center for spectroscopy or the interferometer setting for constructive or destructive interference.

Another advantage of the present invention is, that it is not necessary to set the phase at the beginning of the measurement to a specific value, for example to constructive and/or destructive interference. As an advantage in the present invention, the phase in the interferometer at the start of the measurement can be unknown and/or arbitrary.

Another advantage of the present invention is when the measurements accuracy should be further improved or the measurement time should be further extended, the measurements of the step v) and vi) can be repeated a second time, or a third time, or a fourth time, or more times. The advantage of the present invention is that only each measurement unit (consisting of once the steps v) and vi)) has to be carried out within the stability time of the setup. A readjustment of the system is not necessary between the measurement units because the starting phase in the setup can be unknown. For the calculation in step vii) the measurements of the measurement units can be summed up when more measurement units are carried out.

One principle of the present invention is to calculate the wave front phase at every measurement location from the time varying intensity measurement points. Time varying signals are detected and the relative phase is encoded in these signals. The phase shift between the fields is varied in a known manner during the data collection and the phase shift is taken into account for the calculation.

In a preferred method and/or apparatus the first and/or second non-linear medium is a non-linear crystal, preferably a ppKTP crystal (periodically poled Potassium titanyl phosphate crystal), preferably a BBO crystal, preferably two crystals with the same physical and optical properties.

In a preferred method in step i) and/or step iii) the signal and idler fields are separated by a separation means in or behind the crystal or are separated due to the generation of the signal and idler fields in the non-linear medium, respectively separated due to the generation of the fields in a BBO (β-Barium borate) crystal.

In a preferred method and/or apparatus the phase matching conditions are fulfilled in the generation of the first signal $s_1$ and idler $i_1$ fields and/or the second signal $s_2$ and idler $i_2$ fields.

In a preferred method and/or apparatus behind the first non-linear medium a separation means is arranged in the field path to separate the first signal $s_1$ and idler $i_1$ fields spatially.

In a preferred method and/or apparatus the separation means is a dichroic mirror or a prism or a diffraction grating.

In a preferred method and/or apparatus the pump beam is generated by a pump source comprising a coherent light source or a laser to produce a coherent light beam or a laser beam.

Preferably, the pump source can comprise a coherent light source or a laser to produce the pump beam, respectively a coherent light beam or a laser beam.

In a preferred method and/or apparatus the pump beam is separated into a first pump beam pumping the first non-linear medium and a second pump beam pumping the second non-linear medium, wherein the separation is realized by a pump beam separation means, preferably by a beam splitter or by a polarizing beam splitter with a wave plate.

In a preferred method and/or apparatus the generation of the first and second signal $s_1$, $s_2$ and idler $i_1$, $i_2$ field is realized by induced coherence with and/or without induced emission, preferably by pumping the non-linear medium in low or high gain regime.

In a preferred method and/or apparatus the correlated signal $s_1$, $s_2$ and idler $i_1$, $i_2$ fields are correlated photon beams or correlated photon pairs, respectively entangled photon pairs.

In a preferred method and/or apparatus the first signal $s_1$ field has the wavelength $\lambda s_1$ and the first idler $i_1$ field has the wavelength $\lambda_{i1}$, and/or wherein the second signal $s_2$ field has the wavelength $\lambda_{s2}$ and second idler field has the wavelength $\lambda_{i2}$. Preferably, the wavelength $\lambda s_1$ is equal to the wavelength $\lambda_{s2}$ and/or the is wavelength $\lambda_{i1}$ is equal to wavelength $\lambda_{i2}$. Preferably, the wavelengths $\lambda s_1$ and $\lambda s_2$ are different to the wavelengths $\lambda_{i1}$ and $\lambda_{i2}$. This allows probing an object at a particular wavelength while the measurement on the measurement means is carried out at a different wavelength.

In a preferred method and/or apparatus the expression correlation is preferably understood in the meaning, that the first signal $s_1$ and idler $i_1$ fields and/or the second signal $s_2$ and idler $i_2$ fields are correlated in phase, and/or intensity, and/or amplitude, and/or coherence time, and/or momentum, and/or spatial, and/or spectral characteristics.

In a preferred method and/or apparatus the first signal $s_1$ field and the first idler $i_1$ field are correlated by the generation of the two fields in the first non-linear medium. Preferably, the first signal $s_1$ field and the first idler $i_1$ field are correlated in phase, and/or intensity, and/or amplitude, and/or coherence time, and/or momentum, and/or spatial.

In a preferred method and/or apparatus the second signal $s_2$ field and the second idler $i_2$ field are correlated by the generation of the two fields in the second non-linear medium. Preferably, the second signal $s_2$ field and the second idler $i_2$ field are correlated in phase, and/or intensity, and/or amplitude, and/or coherence time, and/or momentum, and/or spatial.

In a preferred method and/or apparatus the expression indistinguishable is preferably understood in the meaning, that the fields are indistinguishable so that they interfere, preferably they are indistinguishable in all degrees of freedom, so that they interfere. The degree/s of freedom can be spatially, and/or in frequency, and/or in polarization, and/or in mode.

In a preferred method and/or apparatus the interference of the first $s_1$ and second $s_2$ signal fields results from the indistinguishability of the first $s_1$ and second $s_2$ signal fields, preferably on an interference means, preferably a beam splitter or a polarizing beam splitter.

In a preferred method and/or apparatus the interference of the first $s_1$ and second $s_2$ signal fields occurs due to the arrangement of the components to an interferometer. Preferably the components are arranged in a Mach-Zehnder interferometer configuration or an Fizeau-Interferometer configuration or a Michelson-Interferometer configuration.

In a preferred method and/or apparatus the first and second idler $i_1$, $i_2$ fields are correlated, respectively by pumping the non-linear crystal/s with a coherent pump beam and/or by the indistinguishability of the two fields preferably they are indistinguishable in all degrees of freedom, so that they interfere. The degree/s of freedom can be spatially, and/or frequency, and/or in polarization, and/or in mode.

In a preferred method and/or apparatus the first and second signal $s_1$, $s_2$ fields are correlated, respectively by pumping the first and second non-linear crystal with a coherent pump beam and/or by the indistinguishability of the two fields preferably they are indistinguishable in all degrees of freedom, so that they interfere. The degree/s of freedom can be spatially, and/or frequency, and/or in polarization, and/or in mode.

In a preferred method and/or apparatus the spatial and spectral coherence of the pump fields and idler fields is such, that first-order interference between the first signal field s1 and the second signal field s2 can be observed. When the coherence time of the laser is shorter than the propagation time between crystal 1 and crystal 2, the required coherence of the generated fields can be achieved by introducing optical delays in the paths between the pump and the first idler field i1 and in addition the first-order interference between the first signal field s1 and the second signal field s2 condition has to be fulfilled. Here, pump preferably means the pump for the generation of a second signal field s2 and a second idler field $i_2$. This means, it should be unknown in which crystal the field is generated. This can be obtained for example by perfect alignment of the idler field from the first crystal with the idler field from the second crystal.

In a preferred method and/or apparatus by the interference of the first $s_1$ and second $s_2$ signal fields an interfered signal field $s_1$ is generated.

In a preferred method and/or apparatus the combination of the first $i_1$ and second $i_2$ idler fields occurs in and/or behind the second non-linear medium or due to an idler combining means.

In a preferred method and/or apparatus the combination of the first $i_1$ and second $i_2$ idler field is realized due to the spatial overlap of the first and second idler fields $i_1$, $i_2$. Preferably, the spatial overlap of the first and second idler fields $i_1$, $i_2$ is realized by a spatial overlap of the fields in and behind the non-linear medium or in an idler combining means, respectively a beam splitter and/or a dichroic mirror.

In a preferred method and/or apparatus the combination of the first $s_1$ and second $s_2$ signal fields occurs due to a signal combining means.

In a preferred method and/or apparatus the combination is of the first $s_1$ and second $s_2$ signal fields is realized due to the spatial overlap of the first and second idler fields $i_1$, $i_2$. Preferably, the spatial overlap of the first and second idler fields $i_1$, $i_2$ is realized by a signal combining means, respectively a beam splitter and/or a dichroic mirror.

In a preferred method and/or apparatus the interference of the first and second signal fields $s_1$, $s_2$ is realized by a spatial overlap of the fields in a signal combining means, respectively by a beam splitter and/or a 50/50 beam splitter and/or a polarizing beam splitter and/or a dichroic mirror and/or by a spatial overlap of the fields behind the non-linear medium.

In a preferred method and/or apparatus the signal and/or idler combining means comprises a beam splitter and/or a 50/50 beam splitter and/or a polarizing beam splitter and/or a dichroic mirror.

In a preferred method and/or apparatus the measurements in step v) and step vi) are made for a specific point on or in the object.

In a preferred method and/or apparatus the measurements in step v) and step vi) are made without moving the object, in order to not introduce an additional phase shift by the object due to the movement or a different measurement point on the object.

In a preferred method and/or apparatus the phase shift α is created
in the first signal field s1, and/or
in the second signal field s2, and/or
in the first idler field i1, and/or
in the second idler field i2, and/or
in the pump beam in front of the first non-linear medium, preferably in the first pump beam, and/or
in the pump beam in front of the second non-linear medium, preferably in the second pump beam, and/or
between the first and second signal fields $i_1$ and $i_2$, and/or
between the first signal and idler fields $s_1$ and $i_1$, and/or
between the first and the second pump beams, and/or
in the interfered signal field s12.

The preceding options all lead to the same result. Also, a combination, i.e. of several of the options leads to the same result.

In a preferred method and/or apparatus the phase shift α is created by
changing the path length of one or more field/s, and/or
changing the wavelength of the first and/or second pump beam, and/or
by thermal effects, and/or
by spatial displacement or change of the optical path length in one or both interferometer arms.

In a preferred method and/or apparatus in fiber the phase shift α is created by
thermal effects, and/or
changing the path length of one or more field/s, and/or
changing the wavelength of the first and/or second pump beam, and/or
mechanical stress in the fiber.

In a preferred method and/or apparatus in step vi) different phase shift means that the phase shift α is added to the phase in step v) in the setup, preferably in the interferometer.

In a preferred method and/or apparatus the phase in step v), preferably the phase of the setup, preferably of the interferometer in step v) is unknown and/or arbitrary.

In a preferred method and/or apparatus the phase shifts can be introduced by a translation of a mirror and/or a translation of an optical surface and/or a translation of a dichroic mirror, respectively movable by a piezo element, and/or by a fiber expander, and/or by tilting a plane-parallel plate, and/or by an optical frequency difference between two beams, preferably two pump beams and/or by the change of the polarization by an EOM and/or wave plates and/or a polarizing beam splitter and/or a polarizer, and/or by tilting a plane-parallel plate, and or by a rotation or movement of a birefringent plate.

In a preferred method and/or apparatus the stability time of the setup means that during the stability time the change of the visibility of the setup, preferably of the interferometer is in the range of 0.6 to 1, preferably in the range of 0.9 to 1, preferably in the range of 0.95 to 1.

In a preferred method and/or apparatus the detection means is a CCD camera or a CMOS camera or a spectrometer or a fiber array or a SPAD array.

In a preferred method and/or apparatus only the interfered signal field $s_{12}$ detected on the detection means is used to calculate the phase function in step vii), preferably only the detection area of the detection means which detects the interfered signal field $s_{12}$ is used to calculate the phase function in step vii).

In a preferred method in step v) and/or vi) and/or apparatus the intensity and/or the phase and/or the amplitude of the interfered signal field $s_{12}$ is measured.

In a preferred method in step v) and/or vi) and/or apparatus the constructive and destructive interference is measured, respectively by a first and second detection means behind two output arms of an interference means, respectively a 50/50 beam splitter, respectively wherein the 50/50 beam splitter is the signal combining means. When the constructive and destructive interference is measured behind the interference means with two detection means according to the invention still an additional phase shift α is generated in the setup in step vi). The advantage of this embodiment is, that with one phase shift α and the detection of the constructive and destructive interference four measurement steps can be made. Preferably, the phase shift α is added in the measurement on the first output arm of the interference means (for example at the constructive interference) and the phase shift α is added in the measurement on the second output arm of the interference means (for example at the destructive interference).

In a preferred method in step v) and/or vi) one detection means is used wherein for each measurement a phase shift α is generated, or two or more detection means are used, wherein for each additional detection means the same or a separate phase shift α is generated.

In a preferred method and/or apparatus the detection means has a detection area, wherein the whole area is used for one specific measurement in step v) and/or vi), or wherein the area is split into more individual measurement areas, wherein for each individual measurement area a separate phase shift α is generated.

In a preferred method the measurements in step v) and vi) are repeated for each point x, y of the object to calculate the phase function of the whole object Φ(x,y).

The calculation of the phase function Φ of the objects can be made by calculations according to one of the following steps:

In a preferred method and/or apparatus in step v) and vi) two measurements are performed with two different phases, meaning one phase shift α is generated.

In a preferred method and/or apparatus in step v) and vi) three measurements are performed with three different phases, meaning two phase shifts α are generated.

In a preferred method and/or apparatus in step v) and vi) four measurements are performed with four different phases, meaning three phase shifts α are generated.

In a preferred method and/or apparatus in step v) and vi) five measurements are performed with five different phases, meaning four phase shifts α are generated.

In a preferred method and/or apparatus in step v) and vi) six measurements are performed with six different phases, meaning five phase shifts α are generated.

In a preferred method and/or apparatus in step v) and vi) two phase shifts α are generated with only one phase shift step and the measurement of the constructive and destructive interference, respectively by a first and second detection means behind two output arms of an interference means.

In a preferred method the phase function Φ(x,y) is calculated by the measurements in step v) and vi), respectively by intensity measurements in step v) and vi) by $$\Phi(x, y) = \tan^{-1} \frac{I_4 - I_2}{I_1 - I_3},$$

preferably with the intensity $I_1$ of the interfered signal field with phase φ, respectively φ=0 or arbitrary, and intensity $I_2$ of the interfered signal $s_{12}$ field with phase shift α, respectively $$\alpha = \frac{\pi}{2},$$

and intensity $I_3$ or me interfered signal $s_{12}$ field with phase shift α', respectively α'=π, and intensity $I_2$ of the interfered signal $s_{12}$ field with phase shift α", respectively $$\alpha'' = \frac{3\pi}{2}.$$

In a preferred method the phase function Φ(x,y) is calculated by the measurements in step v) and vi), respectively by intensity measurements in step v) and vi) by $$\Phi(x, y) = \tan^{-1}\left\{\left[\frac{1 - \cos\alpha}{\sin\alpha}\right]\frac{I_1 - I_3}{2I_2 - I_1 - I_3}\right\},$$

preferably with the intensity $I_2$ of the interfered signal field $s_{12}$ with phase φ=0 or arbitrary, and intensity $I_1$ of the interfered signal field $s_{12}$ with phase shift α, and intensity $I_3$ of the interfered signal field $s_{12}$ with phase shift α'=−α.

In a preferred method the phase function Φ(x,y) is calculated by the measurements in step v) and vi), respectively by intensity measurements in step v) and vi) by $$\Phi(x, y) = \tan^{-1}\left\{\frac{I_1 - I_3}{2I_2 - I_1 - I_3}\right\},$$

preferably with the intensity $I_2$ of the interfered signal field $s_{12}$ with phase φ=0 or arbitrary, and intensity $I_1$ of the interfered signal field $s_{12}$ with phase shift α, respectively $$\alpha = \frac{\pi}{2},$$

and intensity $I_3$ or the interfered signal field $s_{12}$ with phase shift α', respectively α'=−α.

In a preferred method the phase function Φ(x,y) is calculated by the measurements in step v) and vi), respectively by intensity measurements in step v) and vi) by $$\Phi(x, y) = \tan^{-1}\frac{I_3 - I_2}{I_1 - I_2},$$

preferably with the intensity $I_1$ of the interfered signal field $s_{12}$ with phase $$\varphi = \frac{\pi}{4},$$

and intensity $I_2$ of the interfered signal field $s_{12}$ with phase shift $$\alpha = \frac{3\pi}{4},$$

and intensity $I_3$ of the interfered signal field $s_{12}$ with phase shift $$\alpha' = \frac{5\pi}{4},$$

and

In a preferred method the phase function Φ(x,y) is calculated by the measurements in step v) and vi), respectively by intensity measurements in step v) and vi) by $$\Phi(x, y) = \tan^{-1}\frac{I_4 - I_2}{I_1 - I_3},$$

In a preferred method in step vii) the phase distribution of the object is retrieved by the intensity pattern of the intensity measurements.

In a preferred method and/or apparatus the setup can be designed as an in-fiber setup, preferably with an in-fiber pump, and an in-fiber generation of the fields, and in-fiber interference, and an in-fiber detection. Preferably for the object the first idler field is placed in a free space channel, formed by a first fiber coupler to couple the first idler field out of the fiber and a second fiber coupler to couple the first idler field into the fiber after the object.

In a preferred method and/or apparatus the separation means and the signal combining means are arranged in a Mach-Zehnder interferometer configuration, respectively acting like beam splitter in a Mach-Zehnder interferometer.

In a preferred method and/or apparatus the pump beam separation means and the signal combining means are arranged in a Mach-Zehnder interferometer configuration, respectively acting like beam splitter in a Mach-Zehnder interferometer.

In a preferred method and/or apparatus in the Mach-Zehnder interferometer configuration the first field generation means is arranged before the separation means and behind the pump beam separation means, and wherein the separation means separates the first signal $s_1$ and idler $i_1$ fields, and
wherein the object is placed in the first idler $i_1$ field, and wherein the second field generation is arranged behind the object, and
wherein in the combining means the first signal $s_1$ fields and the second signal $s_2$ fields interfere.

In a preferred method and/or apparatus in the Mach-Zehnder interferometer configuration the first field generation means and the interference means are arranged in a Mach-Zehnder interferometer configuration, respectively acting like beam splitter in a Mach-Zehnder interferometer. Wherein in one arm the second generation means is arranged. Wherein preferably the first and second generation means are BBO crystals.

In a preferred method and/or apparatus the separation means and the signal combining means are arranged in a laser Fizeau interferometer configuration.

In a preferred method and/or apparatus the separation means and the signal combining means are arranged in a laser Michelson-interferometer configuration.

In a preferred method and/or apparatus the interferometer is a polarization interferometer, preferably two polarizations are each sent to one arm of the interferometer.

In a preferred method and/or apparatus the phase shift $\alpha$ is created within the interferometer.

The invention further provides an apparatus for imaging and/or spectroscopy adapted to provide one of the methods above.

The invention further provides an apparatus with a control device adapted to provide one of the methods above, wherein the control device is connected to the phase shifter and to the detection means.

The invention further provides a computer device with a microprocessor with a non-volatile memory, wherein the non-volatile memory comprises an executable program adapted to provide one of the methods above, preferably wherein the computer device is the control device.

BRIEF DESCRIPTION OF THE DRAWINGS

The above and other aspects, features and advantages of the present invention will become more apparent from the following detailed description when taken in conjunction with the accompanying drawings.

DETAILED DESCRIPTION

Figure 1:
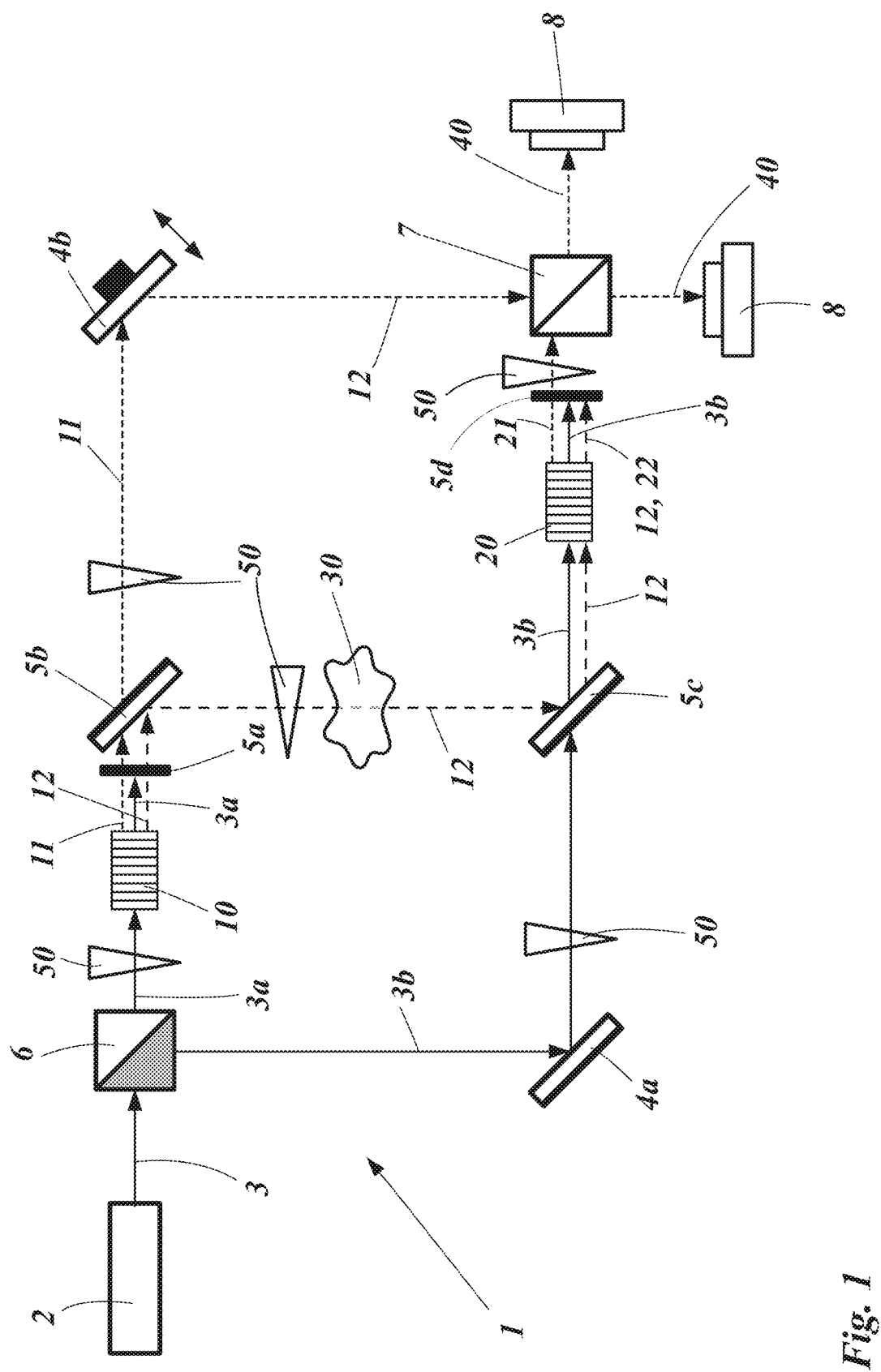
FIG. 1: A first embodiment of the apparatus of the invention in a Mach-Zehnder-Interferometer setup.

FIG. 1 shows a first embodiment of the apparatus of the invention in a Mach-Zehnder-Interferometer configuration. A pump source 2 emits a pump beam 3, preferably a laser beam. The pump beam 3 is split on a pump beam separation means, here a pump beam splitter 6 splits the pump beam 3 into two coherent pump beams 3a and 3b. The pump beam splitter 6 can be a normal beam splitter or a polarizing beam splitter with an additional wave plate (not shown) to rotate the polarization of one of the pump beams 3a or 3b in order to pump a first and second field generation means 10 or 20. The polarization of the first and/or the second pump beams 3a and 3b can be rotated by a wave plate (not shown) to enable the pump of the first and second field generation means 10 and 20. For that, the first pump beam 3a is guided into the first generation means 10 and the second pump beam 3b is guided by a first mirror 4a into the second generation means 20. In the path of the second pump beam 3b a third dichroic mirror 5c is arranged allowing the second pump beam 3b to travel through the third dichroic mirror 5c.

As described above, the first generation means 10 is pumped by the first pump beam 3a, generating a first signal field 11 and first idler field 12. The first pump beam 3a is blocked after the first generation means 10 by a first dichroic mirror 5a allowing the first signal field 11 and first idler field 12 to pass through.

The first signal field 11 and first idler field 12 are then separated on a separation means, in FIG. 1 on a second dichroic mirror 5b. The first signal field 11 is transmitted through the second dichroic mirror 5b and travels guided by second mirror 4b, preferably by a movable mirror to a beam splitter 7.

The first idler field 12 is reflected on the second dichroic mirror 5b and interacts by transmission and/or reflection with an object 30. The first idler field 12 is then guided by the third dichroic mirror 5c into the second generation means 20.

The second generation means 20 is pumped by the second pump beam 3b, generating a second signal field 21 and second idler field 22. In and/or behind the second generation means 20 the first idler field 12 overlaps spatially with the second idler field 22, such that the two fields are indistinguishable. The second pump beam 3b and the overlapping first and second idler fields 12 and 22 are blocked by a fourth dichroic mirror 5d whereas the second signal field 21 is transmitted and guided on the beam splitter 7.

A Mach-Zehnder-Interferometer is created with an upper and a lower interferometer-arm between the pump beam splitter 6 and the beam splitter 7.

The first and second signal fields 11 and 21 interfere on the beam splitter 7. On both outputs of the beam splitter 7, detection means, preferably CCD cameras are arranged to detect the intensity pattern of the interfered signal field 40.

The phase shift α is generated by one or more phase shifting means 50. In FIG. 1 more phase shifting means 50 are depicted whereas only one but also more phase shifting means 50 can be arranged in the apparatus for imaging and spectroscopy 1. In FIG. 1, only as an example, the phase shifting means 50 are shown on more places. The phase shifting means 50 can be the second mirror 4b by translation of the mirror preferably movable by a piezo element. The phase shifting means 50 can also be a fiber expander (for a fiber interferometer setup), and/or a tilting plane-parallel plate, and/or an optical element introducing a frequency difference between the two pump beams 3a and 3b, and/or an EOM (electro optic modulator) and/or wave plates and/or a polarizing beam splitter and/or a polarizer by changing the polarization, and/or plane-parallel plate by tilting the plate, and or a birefringent plate by tilting the plate.

The possible places of the phase shifting means 50 are in the first signal field $s_1$ 11 and/or, in the second signal field $s_2$ 21 and/or, in the first idler field $i_1$ 12 and/or, in the second idler field $i_2$ 22 and/or, in the first pump beam 3a and/or, in the second pump beam 3b.

Figure 2:
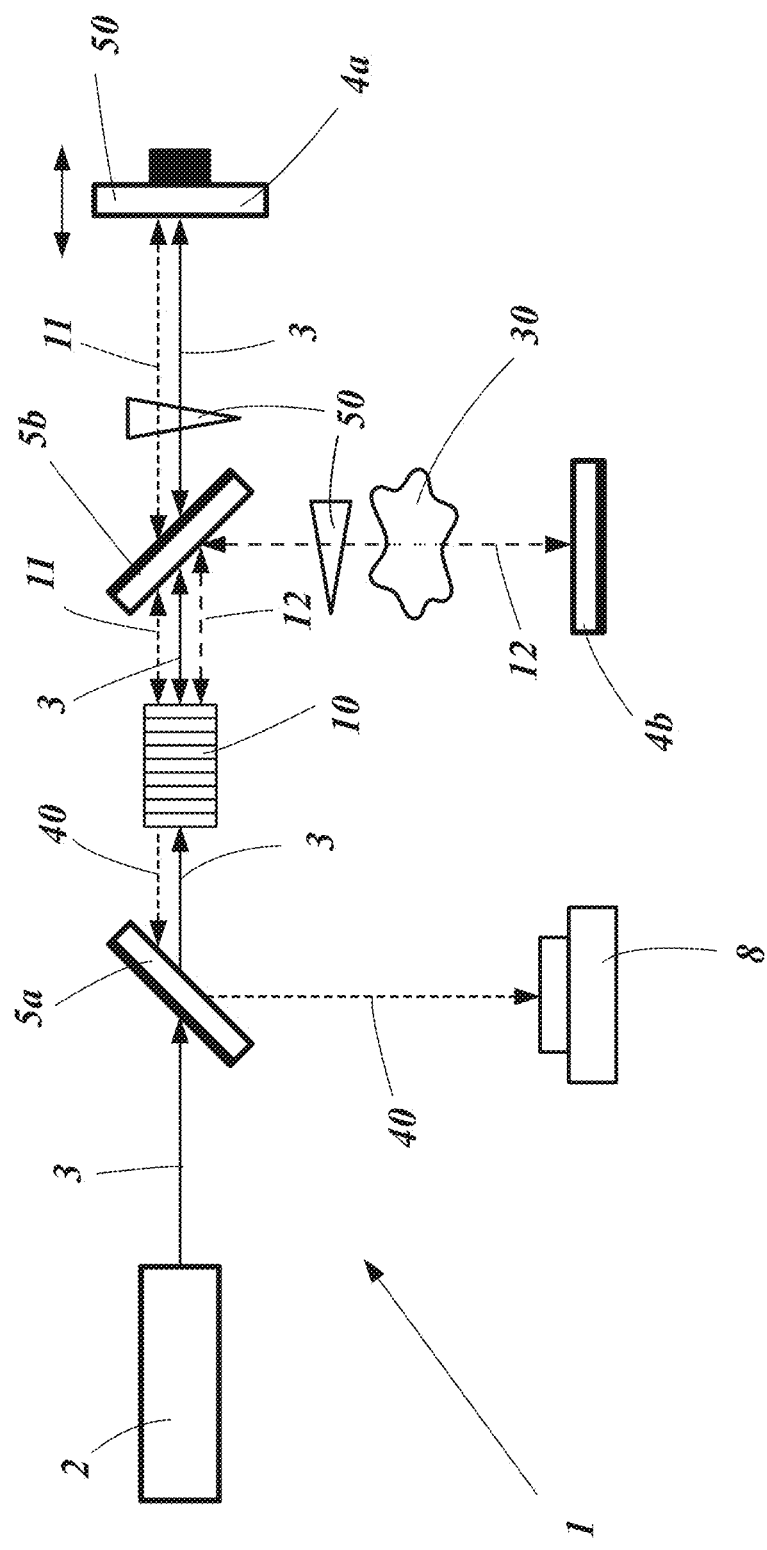
FIG. 2: A second embodiment of the apparatus of the invention in a Fizeau-Interferometer setup.

FIG. 2 shows a second embodiment of the apparatus of the invention in a Fizeau-Interferometer configuration. The pump source 2 emits a pump beam 3 which is transmitted through a first dichroic mirror 5a and pumps a generation means 10, wherein the generation means 10 acts in this pump direction as a first generation means 10 and generates the first signal field 11 and the first idler field 12.

The first signal field 11 and the pump beam 3 transmit through a second dichroic mirror 5b and are reflected on the first mirror 4a, preferably on the movable first mirror 4a. After the reflection on the first mirror 4a the signal field 11 and the pump beam 3 are transmitted through the dichroic mirror 5b a second time and are guided into the generation means 10.

The first idler field 12 is reflected on the second dichroic mirror 5b and interacts with the object 30 by transmission and/or reflection and is guided by a second mirror 4b back on the second dichroic mirror 5b and is guided into the generation means 10.

By the second time, the generation means is pumped from the right side in FIG. 2 by the pump beam 3, the generation means 10 acts as a second generation means by this pump direction generating the second signal field 21 and second idler field 22. The first signal field 11 and the second signal field 21 overlap spatially in and behind the generation means 10, such that the signal fields interfere. The first idler field 12 and the second idler field 22 overlap spatially in and behind the generation means, such that the paths of the first idler field 12 and the second idler field 22 are indistinguishable. The interfered signal fields 40 are reflected on the first dichroic mirror and detected by the detection means.

As in FIG. 1, here in FIG. 2 more phase shifting means 50 are depicted whereas only one but also more phase shifting means 50 can be arranged in the apparatus for imaging and spectroscopy 1. In FIG. 2, only as an example, the phase shifting means 50 are shown on more places. The phase shifting means 50 can be the first mirror 4a by translation of the mirror, preferably movable by a piezo element. The phase shifting means 50 can be the second mirror 4b by translation of the mirror (not shown in FIG. 2), preferably movable by a piezo element. The phase shifting means 50 can also be a fiber expander (for a fiber interferometer setup), and/or a tilting plane-parallel plate, and/or an optical element introducing a frequency difference between the two pump beams 3a and 3b, and/or an EOM (electro optic modulator) and/or wave plates and/or a polarizing beam splitter and/or a polarizer by changing the polarization, and/or plane-parallel plate by tilting the plate, and or a birefringent plate by tilting the plate.

The possible places of the phase shifting means 50 are in the first signal field $s_1$ 11 and/or in the first idler field $i_1$ 12 and/or in the pump beam 3.

Figure 3:
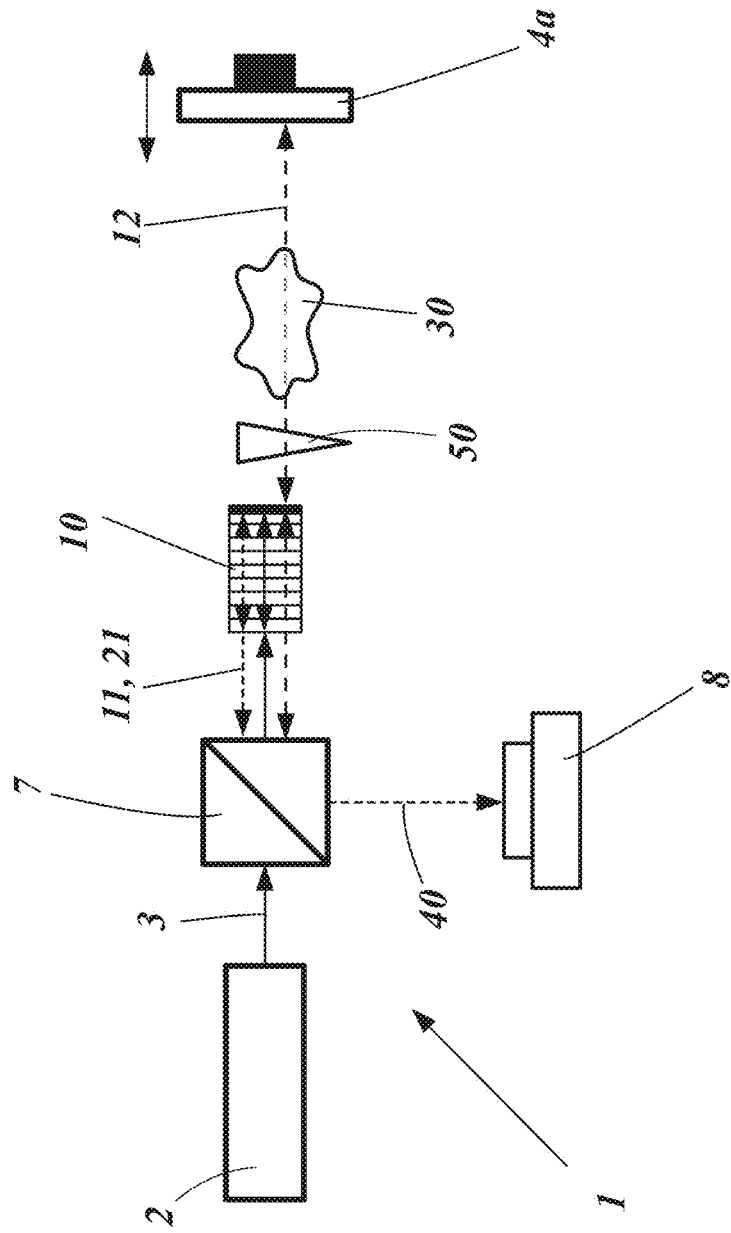
FIG. 3: A third embodiment of the apparatus of the invention.

FIG. 3 shows a third embodiment of the apparatus of the invention in a Fizeau-Interferometer-like configuration. The difference to FIG. 2 is that in FIG. 3 the first dichroic mirror 5a is replaced by a beam splitter 7, and the first signal field 11 is reflected on the surface of the generation means 10 to change the pump direction for the generation of the second signal 21 and idler 22 fields. Only the first idler beam is transmitted through the surface, interacts with the object and is guided back in the generation means 10.

Figure 4:
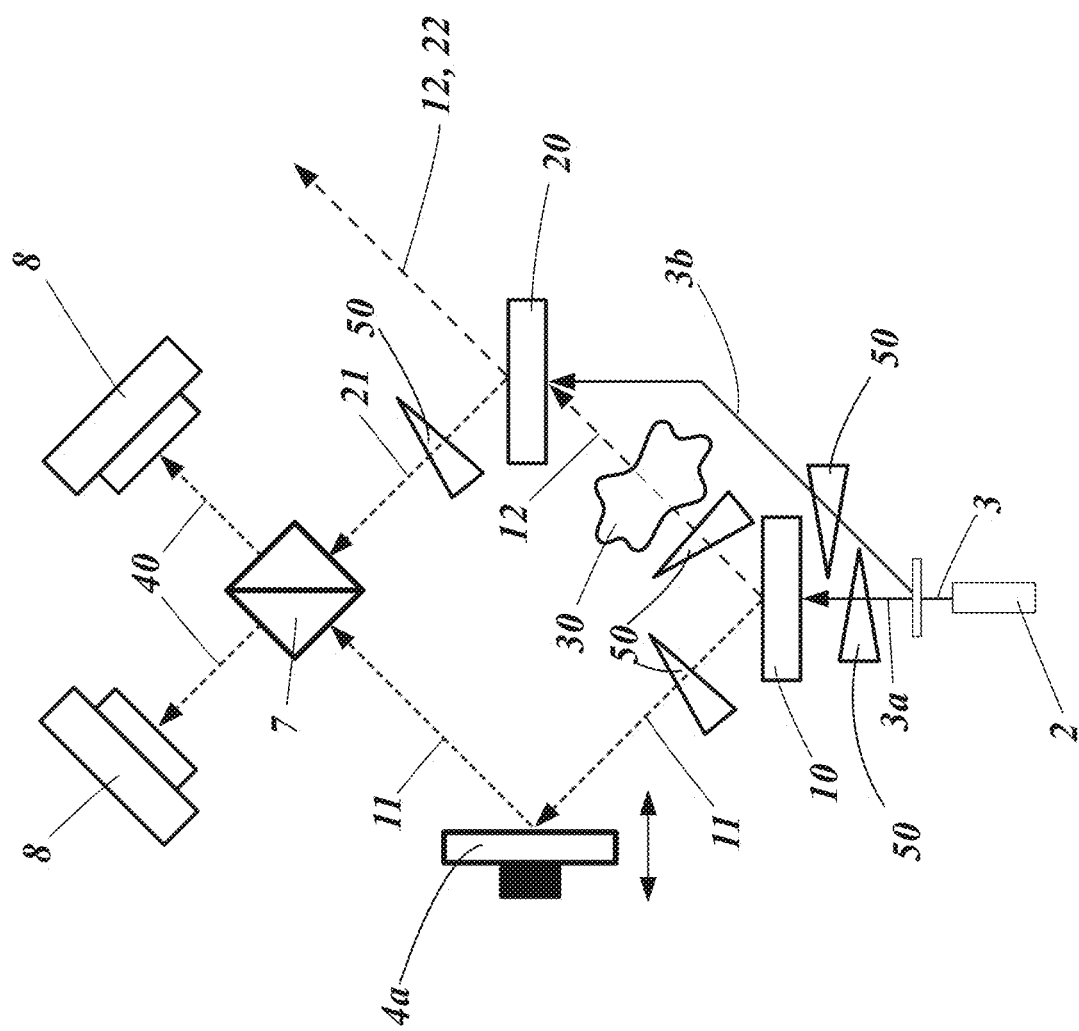
FIG. 4: A fourth embodiment of the apparatus of the invention in a Mach-Zehnder-Interferometer setup with BBO-crystals.

FIG. 4 shows a fourth embodiment of the apparatus of the invention in a Mach-Zehnder-Interferometer setup with BBO-crystals.

The pump source 2 emits a pump beam 3 which is split into a first and a second pump beam 3a and 3b, whereas the polarization can be adjusted by a wave plate (not shown) to pump the first and second generation means 10 and 20. In this embodiment, the first and second generation means 10 and 20 are BBO crystals, emitting the first signal field 11 and the first idler field 21 in the first generation means 10, and the second signal field 21 and the second idler field 22 in the second generation means 20 under a specific angle.

The first generation means 10 pumped by the first pump beam 3a generates the first signal field 11 and the first idler field 21. The first signal field 11 is reflected on the first mirror 4a, preferably on a movable mirror and guides the first signal field 11 into the beam splitter 7. The first idler field 12 interacts with the object 30 by transmission and/or reflection and is guided into the second generation means 20.

The second generation means 20 pumped by the second pump beam 3b generates the second signal field 21 and the second idler field 22. The first and second idler fields 12 and 22 overlap spatially in and behind the second generation means 20 such that the first and second idler fields 12 and 22 are indistinguishable. The second signal field 21 is guided to the beam splitter 7 and interferes with the first signal field 11 on the beam splitter. On both output arms of the beam splitter, detection means 8 are arranged to detect the interfered signal fields 40.

As before, here in FIG. 4 more phase shifting means 50 are depicted whereas the only one or more phase shifting means 50 can be arranged in the apparatus for imaging and spectroscopy 1. In FIG. 4, only as an example, the phase shifting means 50 are shown on more places. The phase shifting means can be the first mirror 4a by translation of the mirror, preferably movable by a piezo element. The phase shifting means 50 can also be a fiber expander (for a fiber interferometer setup), and/or a tilting plane-parallel plate, and/or an optical element introducing a frequency difference between the two pump beams 3a and 3b, and/or an EOM (electro optic modulator) and/or wave plates and/or a polarizing beam splitter and/or a polarizer by changing the polarization, and/or plane-parallel plate by tilting the plate, and or a birefringent plate by tilting the plate.

The possible places of the phase shifting means 50 are in the first signal field $s_1$ 11 and/or in the second signal field $s_2$ 21 and/or in the first idler field $i_1$ 12 and/or, in the second idler field $i_2$ 22 and/or in the first pump beam 3a and/or in the second pump beam 3b.

REFERENCE SYMBOL LIST

1 apparatus for imaging and spectroscopy
2 pump source 3 pump beam
3a first pump beam
3b second pump beam
4a first mirror
4b second mirror
5a first dichroic mirror
5b second dichroic mirror
5c third dichroic mirror
5d fourth dichroic mirror
6 pump beam splitter
7 beam splitter (BS)
8 detection means
10 first field generation means
11 first signal field
12 first idler field
20 second field generation means
21 second signal field
22 second idler field
30 object
40 interfered signal field
50 phase shifter

The invention claimed is:

1. Method for imaging and/or spectroscopy using an interferometer setup, comprising the steps
   i) generation of a first signal field $s_1$ and a first idler field $i_1$, by pumping a first non-linear medium with a pump beam, such that the two fields are correlated,
   ii) illumination of an object with the first idler $i_1$ field, respectively by transmission and/or reflection,
   iii) generation of a second signal field $s_2$ and a second idler field $i_2$,
      by pumping a spatial separate second non-linear medium with the pump beam, or
      by pumping the first non-linear medium a second time with the pump beam, such that the two fields are correlated,
   iv) combination of the first $i_1$ and second $i_2$ idler fields, such that the two fields are indistinguishable, and combination of the first $s_1$ and second $s_2$ signal fields, such that the two fields interfere,
   v) first measurement of the interfered signal field $s_{12}$ by a detection means,
   vi) one or more additional measurements of the interfered signal field $s_{12}$ by the detection means,
   wherein for each additional measurement in step vi) a phase shift $\alpha$ is generated in the interferometer setup, and the phase shift $\alpha$ is varied from measurement-to-measurement in a known manner, and
   wherein the first measurement in step v) and the one or more additional measurements in step vi) are all carried out within a stability time of the interferometer setup,
   and vii) calculation of a phase function $\Phi$ of the object out of the measurements from step
      v) and step vi) in order to get an image and/or a spectrum of the object.

2. The method according to claim 1,
   wherein the phase shift $\alpha$ is created
      in the first signal field $s_1$ and/or
      in the second signal field $s_2$ and/or
      in the first idler field $i_1$ and/or
      in the second idler field $i_2$ and/or
      in the pump beam in front of the first non-linear medium, preferably in the first pump beam and/or
      in the pump beam in front of the second non-linear medium, preferably in the second pump beam and/or
      between the first and second signal fields $i_1$ and $i_2$ and/or
      between the first signal and idler fields $s_1$ and $i_1$, and/or
      between the first and the second pump beams, and/or
      in the interfered signal field $s_{12}$.

3. The method according to claim 1,
   wherein the phase shift $\alpha$ is created by
      changing the path length of one or more field/s, and/or
      changing the wavelength of the first and/or second pump beam, and/or
      by thermal effects, and/or
      by spatial displacement or change of the optical path length in one or both interferometer arms.

4. The method according to claim 1,
   wherein the phase shifts can be introduced by a translation of a mirror and/or a translation of an optical surface and/or a translation of a dichroic mirror, respectively movable by a piezo element, and/or by a fiber expander, and/or by tilting a plane-parallel plate, and/or by an optical frequency difference between two beams, preferably two pump beams and/or by the change of the polarization by an EOM and/or wave plates and/or a polarizing beam splitter and/or a polarizer, and/or by tilting a plane-parallel plate, and or by a rotation or movement of a birefringent plate.

5. The method according to claim 1,
   wherein the phase of the setup in step v) is unknown and/or arbitrary.

6. The method according to claim 1,
   wherein in step i) and/or step iii) the signal and idler fields are separated by a separation means in or behind the crystal or are separated due to the generation of the signal and idler fields in the non-linear medium, respectively separated due to the generation of the fields in a BBO crystal.

7. The method according to claim 1,
   wherein in step v) and/or vi) the constructive and destructive interference is measured, respectively by a first and second detection means behind two output arms of an interference means, respectively a 50/50 beam splitter, respectively wherein the 50/50 beam splitter is the signal combining means.

8. The method according to claim 1,
   wherein in step v) and/or vi) one detection means is used, wherein for each measurement a phase shift $\alpha$ is generated, or two or more detection means are used, wherein for each additional detection means the same or a separate phase shift $\alpha$ is generated.

9. Apparatus for imaging and/or spectroscopy using an interferometer setup, comprising
   a pump source to generate a pump beam, and
   a first signal $s_1$ and idler $i_1$ field generation means pumped by the pump beam, and
   a second signal $s_2$ and idler $i_2$ field generation means pumped by the pump beam,
   wherein the first and the second field generation means are
      two spatial separated non-linear media pumped by the pump beam, or
      one non-linear medium, pumped by the pump beam a first time to generate a first signal $s_1$ and idler $i_1$ field and pumped a second time to generate a second signal $s_2$ and idler $i_2$ field, and
   an object to be measured which is illuminated, respectively by transmission or reflection, by the first idler field $i_1$, and
   a signal combining means to overlap the first signal $s_1$ and second signal $s_2$ fields, such that the two fields interfere, and an idler combining means to overlap the first idler $i_1$ and second idler $i_2$ fields, such that the two fields are indistinguishable, and a detection means to detect the intensity and/or phase of the interfered signal field, characterized in that, a phase shifter is arranged in the first signal $s_1$ field, and/or in the second signal $s_2$ field, and/or in the pump beam, and/or in the indistinguishable first and second signal fields $s_1$ and $s_2$, wherein the phase shifter is adapted to introduce a phase shift α in the apparatus during the measurement in order to get an image and/or a spectrum of the object, and the phase shift α is varied during the measurement in a known manner.

10. Apparatus according to claim 9, wherein the phase shifts can be introduced by a movable mirror and/or a movable optical surface and/or a movable dichroic mirror, respectively movable by a piezo element, and/or by a fiber expander, and/or by a tiltable plane-parallel plate, and/or by an optical frequency difference between two beams, preferably two pump beams and/or by the change of the polarization by an EOM and/or wave plates and/or a polarizing beam splitter and/or a polarizer, and/or by a tiltable plane-parallel plate, and/or by a rotatable or moveable birefringent plate.

11. Apparatus according to claim 9, wherein the separation means and the signal combining means are arranged in a Mach-Zehnder interferometer configuration or a laser Fizeau interferometer configuration, or a Michelson-interferometer configuration.

12. Apparatus according to claim 11, wherein the phase shift a is created within the interferometer.

13. Apparatus according to claim 9, wherein the apparatus comprises a control device adapted to provide one of the methods above, wherein the control device is connected to the phase shifter and to the detection means.

14. A non-transient computer-readable medium having stored thereon a computer-readable program for executing a method for at least one of imaging or spectroscopy using an interferometer setup, the method comprising the steps of:

i) generation of a first signal field $s_1$ and a first idler field $i_1$, by pumping a first non-linear medium with a pump beam, such that the two fields are correlated, ii) illumination of an object with the first idler $i_1$ field, respectively by transmission and/or reflection, iii) generation of a second signal field $s_2$ and a second idler field $i_2$, by pumping a spatial separate second non-linear medium with the pump beam, or by pumping the first non-linear medium a second time with the pump beam, such that the two fields are correlated, iv) combination of the first $i_1$ and second $i_2$ idler fields, such that the two fields are indistinguishable, and combination of the first $s_1$ and second $s_2$ signal fields, such that the two fields interfere, v) first measurement of the interfered signal field $s_{12}$ by a detection means, vi) one or more additional measurements of the interfered signal field sit by the detection means, wherein for each additional measurement in step vi) a phase shift α is generated in the interferometer setup, and the phase shift α is varied from measurement-to-measurement in a known manner, and wherein the first measurement in step v) and the one or more additional measurements in step vi) are all carried out within a stability time of the interferometer setup, and vii) calculation of a phase function Φ of the object out of the measurements from step v) and step vi) in order to get an image and/or a spectrum of the object.

* * * * *